R. F. NELSON.
TOOL KIT FOR MOTOR VEHICLES.
APPLICATION FILED SEPT. 30, 1920.
1,419,166.
Patented June 13, 1922.
4 SHEETS—SHEET 3.
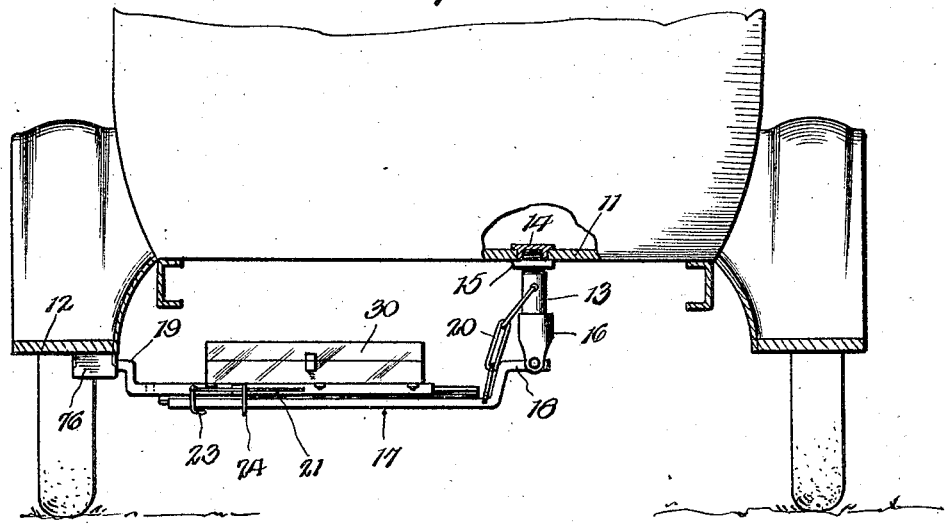
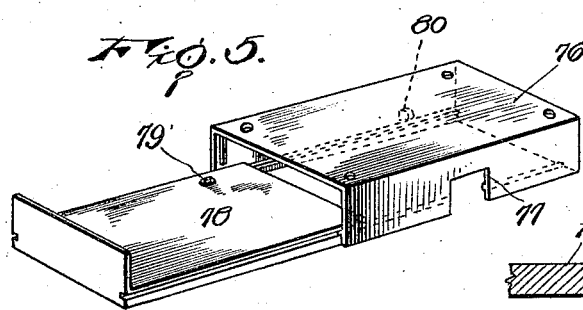
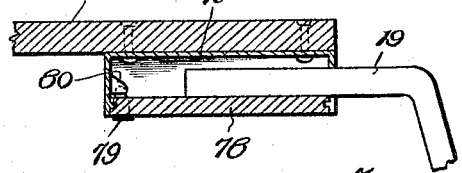
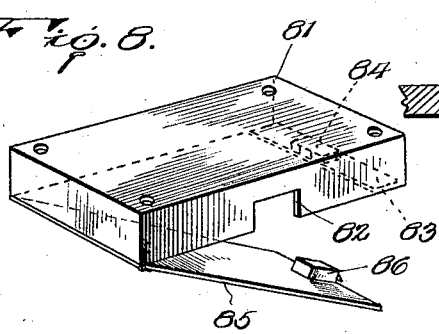
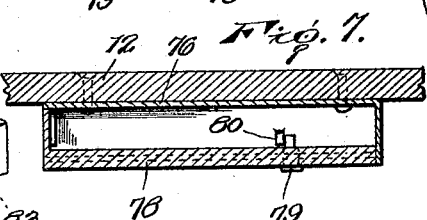
Inventor
R. F. Nelson.
By Lacey & Lacey, Attorneys

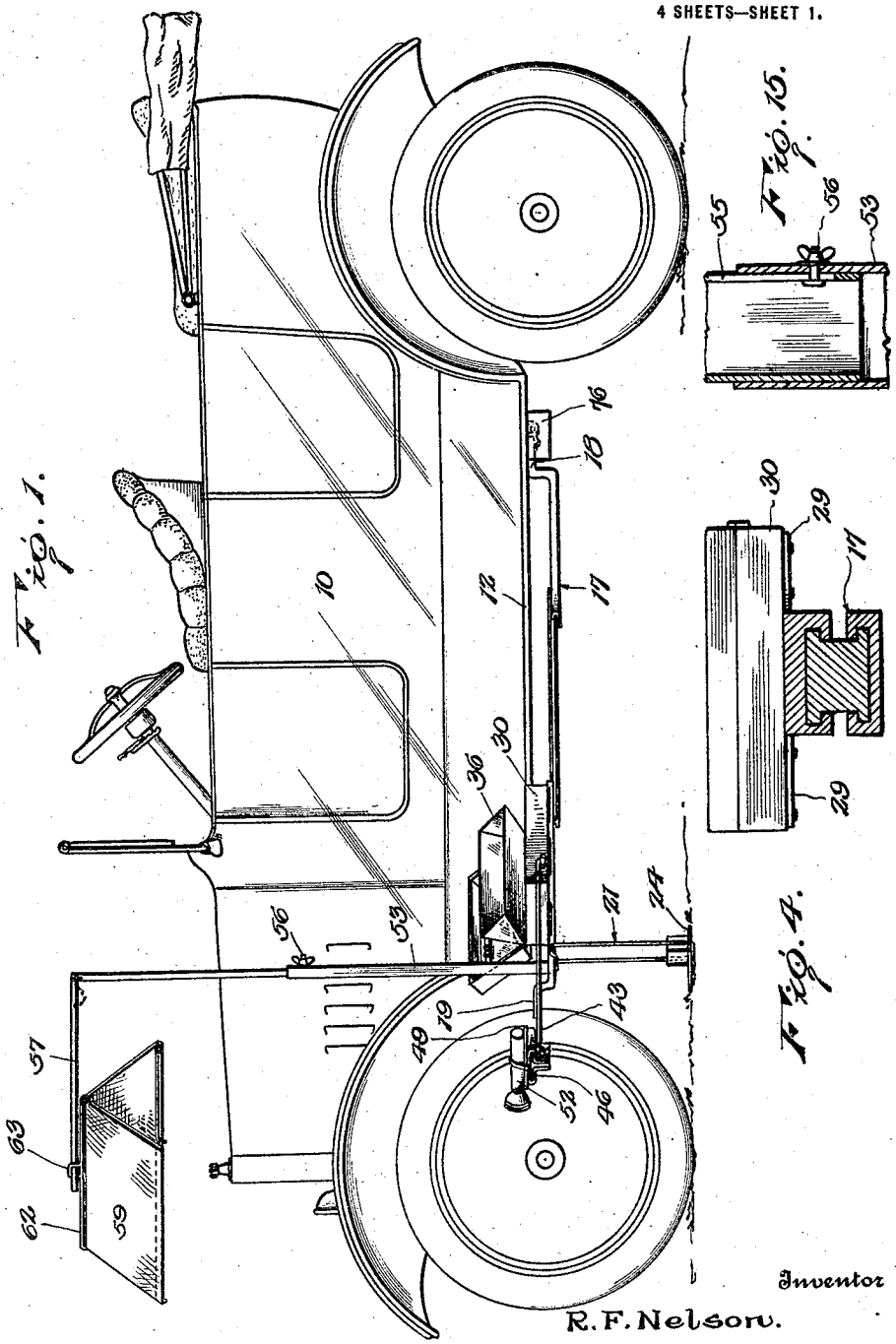

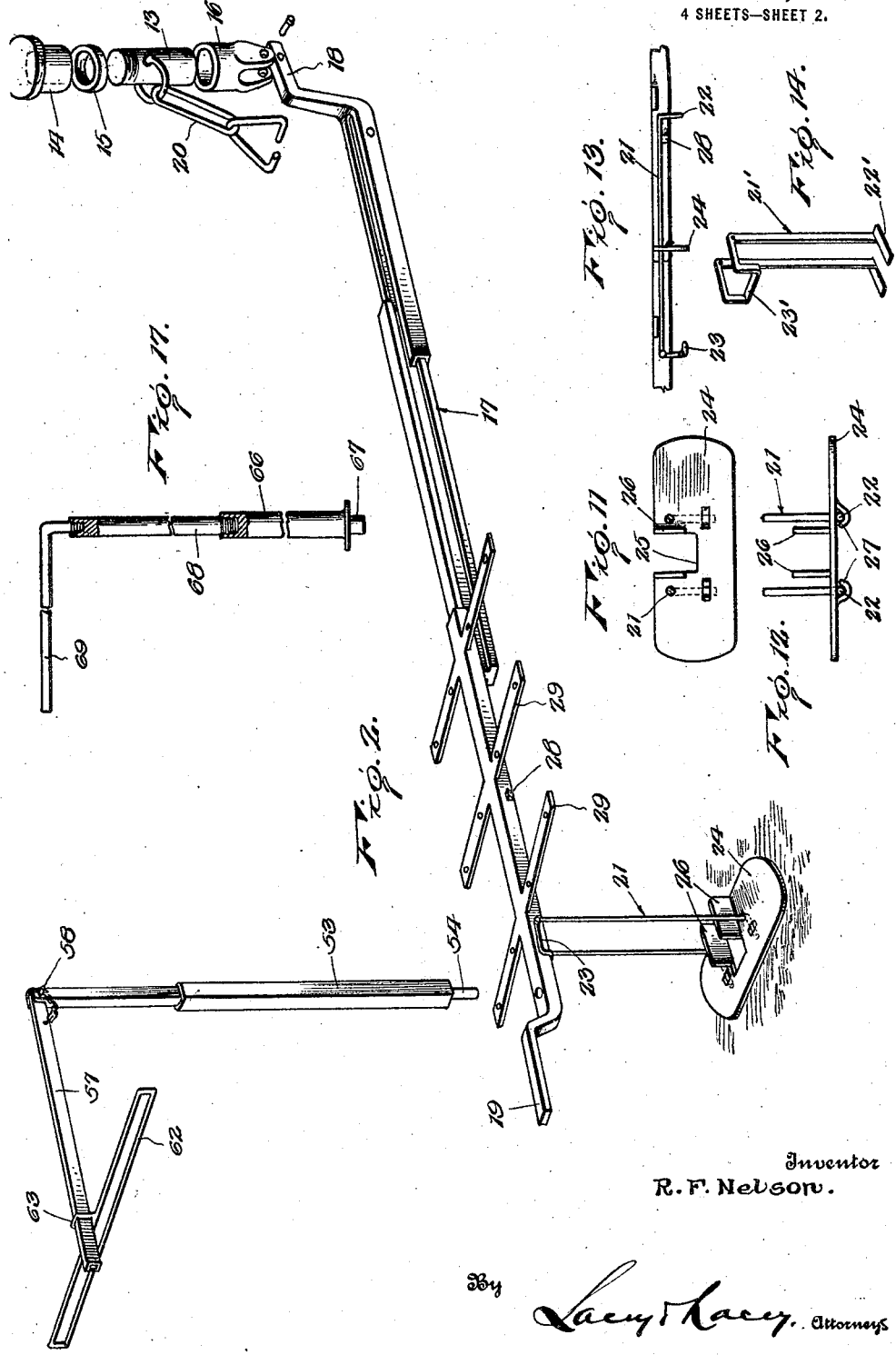

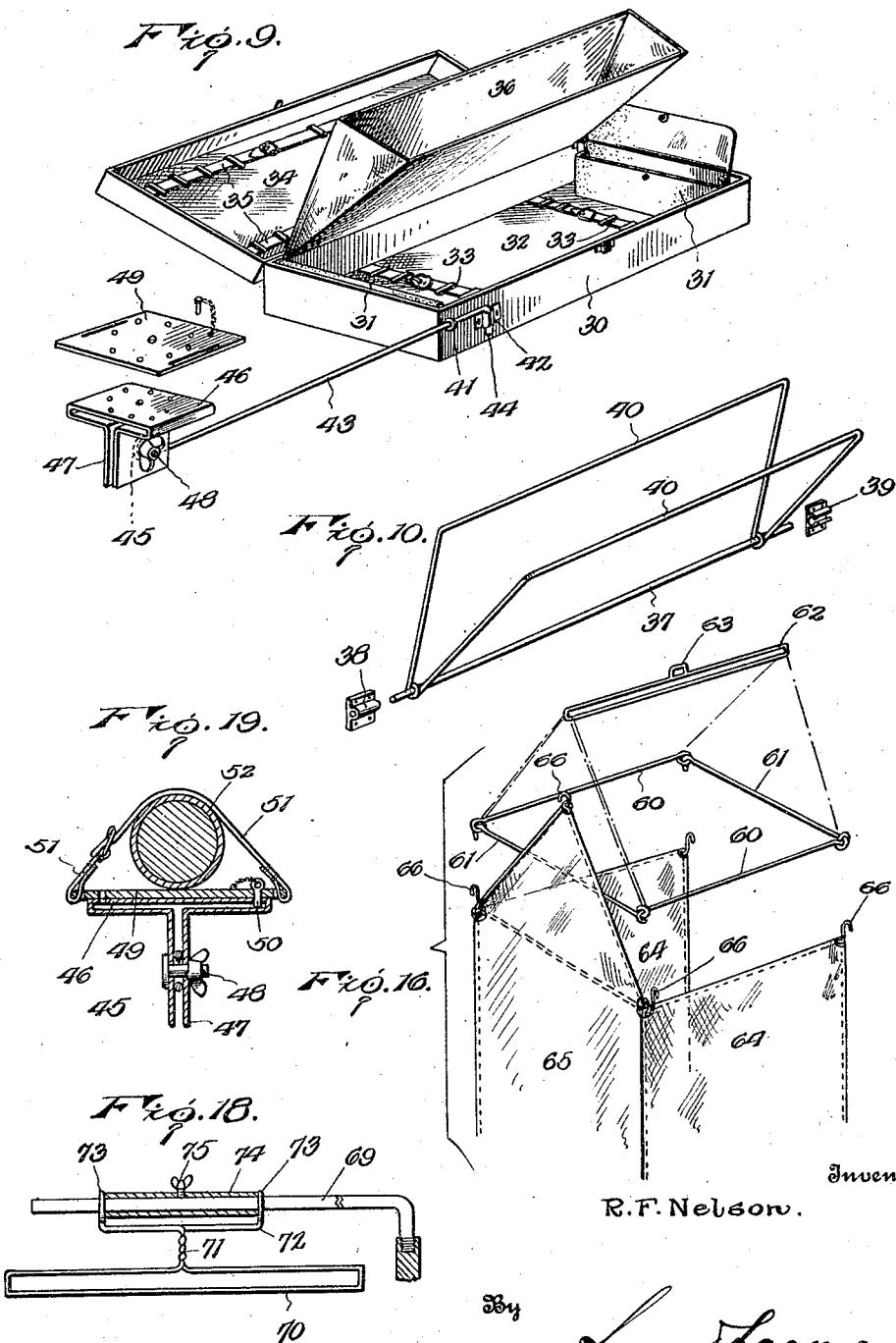

UNITED STATES PATENT OFFICE.

RAYMOND F. NELSON, OF DETROIT, MICHIGAN.

TOOL KIT FOR MOTOR VEHICLES.

1,419,166.  Specification of Letters Patent.  Patented June 13, 1922.

Application filed September 30, 1920. Serial No. 413,906.

*To all whom it may concern:*

Be it known that I, RAYMOND F. NELSON, a citizen of the United States, residing at Detroit, in the county of Wayne and State of Michigan, have invented certain new and useful Improvements in Tool Kits for Motor Vehicles, of which the following is a specification.

This invention relates to an improved tool kit for motor vehicles and has as one of its principal objects to provide a device of this character which may be carried beneath the body of a vehicle while, at the same time, access to the device may be readily had.

A further object of the invention is to provide a device which may be locked in its folded position lying beneath the vehicle body to thus prevent unauthorized use of the kit.

A still further object of the invention is to provide a construction wherein the kit may be arranged near any one of the wheels of the vehicle so that the tools of the kit will be conveniently accessible when working on any particular wheel.

And the invention has as a still further object to provide a device which may be readily employed in connection with a motor vehicle of substantially any conventional design.

Other and incidental objects will appear hereinafter.

In the drawings:

Figure 1 is a side elevation showing my improved tool kit extended at one side of a motor vehicle of conventional design, Figure 2 is a perspective view particularly showing the extensible arm of the kit and associated parts, Figure 3 is a rear elevation showing the device folded beneath the vehicle, parts being broken away and shown in section, Figure 4 is a transverse section particularly showing the construction of the extensible arm, Figure 5 is a detail perspective showing the lock box employed for securing the kit folded beneath the vehicle, Figure 6 is a transverse sectional view taken through the box, Figure 7 is a longitudinal sectional view taken through the box, Figure 8 is a perspective view showing a slightly modified form of lock box, Figure 9 is a perspective view particularly showing the tool box employed, Figure 10 is a detail perspective showing the frame of the middle pocket of the tool box, Figure 11 is a transverse section taken through the supporting leg for the extensible arm of the device, Figure 12 is a fragmentary edge elevation of said leg, Figure 13 is a fragmentary side elevation showing the leg folded, Figure 14 is a detail perspective showing a slightly modified form of leg frame, Figure 15 is a detail section taken through the canopy post employed, Figure 16 is a perspective view particularly showing the frame of the canopy employed as well as the side curtains provided in connection with the canopy, Figure 17 is an elevation showing a slightly modified form of canopy post, Figure 18 shows a modified form of canopy hanger provided in connection with the modified form of canopy post, and Figure 19 is a detail section taken through the lamp bracket provided.

In order that the construction, mounting and operation of my improved tool kit may be accurately understood I have, in the drawings, shown the invention in connection with a motor vehicle 10 of conventional design. The floor of the vehicle body is indicated at 11 and one of the running boards thereof at 12. In carrying the invention into effect, I employ, as particularly shown in Figures 2 and 3 of the drawings, a tubular post 13 which is fitted through the floor 11 of the vehicle body and connected therewith by a cap 14 threaded upon the upper end of the post, a washer 15 being also threaded upon the post to bear against the lower face of the floor so that the post will be rigidly fixed thereto. Upon the lower end of the post is swiveled a yoke 16 and pivoted upon said yoke is an extensible arm 17. This arm is formed of three mating sections, the innermost of which is provided with an offset terminal 18 connected to the yoke while the outermost section of said arm is provided with an offset terminal or end portion 19. Extending between the post and the innermost section of the arm are links 20 designed to prevent the free end of the arm from dropping to the ground. As particularly shown in Figures 2 and 4, the intermediate or middle section of the arm 17 resembles an I-beam and the innermost section of the arm is formed to fit around the lower edge of the middle section while the outermost section is formed to fit around the upper edge of the middle section so that the middle section may be slidably shifted outwardly upon the innermost section while the outermost section may be slidably shifted outwardly upon the middle section. Swingingly mounted upon the outermost section is a supporting leg for the arm. This leg includes a frame 21 which is preferably formed from a length of suitable resilient wire and is provided with spaced parallel sides at the lower ends of which the wire is bent to form laterally directed terminals 22. At the upper ends of the sides, the frame is bent to provide pivot loops through which are engaged suitable studs pivotally connecting the frame with the arm section and from said loops the frame is formed with a forwardly directed stop bracket 23 adapted to embrace the section of the arm and the bight of which is bent downwardly to lie beneath the arm. Slidable upon the sides of the frame is a foot 24. This foot is preferably formed of suitable sheet metal and, as shown in detail in Figure 11, is provided medially with a notch 25 at opposite sides of which are upstanding flanges 26. The sides of the frame pass freely through the foot adjacent said flanges and struck downwardly from the foot in advance of the flanges are confronting clamping tongues 27 engageable over the terminals 22 of the sides of the frame for holding the foot against said terminals. Thus, when the leg is swung downwardly to active position, as shown in Figure 2, the stop bracket 23 of the frame will bear beneath the outermost section of the arm 17 while the foot 24 will rest against the ground so that the leg will firmly support the arm at its outer end. By flexing the terminals 22 inwardly toward each other, said terminals may be disengaged from beneath the tongues 27, when the foot may be moved upwardly along the sides of the frame. The frame may then be folded upwardly upon the outermost section of the arm so that the sides of the frame will lie along the sides of said section, the notch 25 of the foot freely receiving the section therein. Projecting from the sides of the outer section of the arm are lugs 28 engageable with the sides of the frame of the leg, as shown in detail in Figure 13, for holding the leg folded.

In Figure 14, I have shown a slightly modified form of leg frame 21'. In this modification, the frame is constructed of suitable sheet metal and includes parallel sides provided at their upper ends with openings so that the frame may be pivotally mounted upon the outer section of the arm 17 and extending from said sides at their lower ends are forwardly directed terminals 22' while from the upper ends of said sides extends a forwardly directed stop bracket 23'.

Extending laterally from the outermost section of the arm 17 are wings 29 and riveted or otherwise secured to said wings is a tool box 30. As shown in detail in Figure 9, this tool box includes a box body normally closed by a lid and preferably, a suitable lock will be provided for securing the lid in closed position. In each end of the box body is arranged a pocket 31 and extending between said pockets is a canvas mat 32 carrying straps 33 providing loops for receiving various tools. A similar mat 34 is arranged within the cover and this mat also carries straps 35 providing loops for receiving additional tools. Mounted upon the rear wall of the box body at its upper margin is a pocket 36. This pocket is carried by a pivot rod 37 which, as shown in detail in Figure 10, is engaged at one end in a keeper 38 upon the rear wall of the box body while the opposite end of said rod is held by a split sleeve 39 upon said wall. Thus, when desired, the pocket may be removed. Looped around the pivot rod is a length of wire bent to form the skeleton sides 40 of the pocket and preferably, suitable canvas is arranged about these sides to provide the pocket. The pocket will afford a convenient place for carrying a spare inner tube. Projecting from the outer side wall of the box near one end thereof is an eye 41 and arranged in the rear of this eye is a split clamping sleeve 42. Supported by said eye and sleeve is a lamp bracket which includes a bracket arm 43 adapted to freely fit through the eye and provided at its inner end with a laterally directed terminal 44 to extend through the sleeve. At its outer end the bracket arm is formed with an eye 45 and pivoted uopn said eye is a bracket base 46. This base is preferably formed from a strip of suitable sheet metal bent to define spaced depending flanges 47 embracing the eye and engaged through said flanges and through the eye is a clamping bolt 48 preferably equipped with a wing nut so that the base may be adjustably rocked upon the bolt and then secured in adjusted position. Swiveled upon the base is a lamp supporting plate 49 provided with an annular series of openings. The base is provided with a similar series of openings adapted to register with the openings in the plate and secured to said plate is a pin 50 engageable through said openings for locking the plate in adjusted position. Accordingly, the base may be rotatably adjusted in one plane while the lamp supporting plate may be adjustably rotated in a plane at substantially right angles to the plane of adjustment of the base. Near its ends, the plate 49 is formed with slots and engaged through said slots are straps 51, one of which is provided with a buckle. Accordingly, a flash light, as conventionally illustrated at 52, may be rested upon the plate 49 and secured thereto by said straps, it being possible to manipulate the base 46 and plate 49 of the bracket for directing the lamp as desired. Any other approved type of lamp may, of course, be employed.

In conjunction with the arm 17, I provide a canopy post 53. As best shown in Figure 2, this post is formed of a pair of telescopic sections, the outermost of which is provided at its lower end with a stud 54 engageable in a suitable opening in the outer end portion of the outermost section of said arm for removably connecting the post therewith. Formed in a wall of the inner section of the post is, as shown in detail in Figure 15, a vertical slot 55 and fixed to a wall of the outer section of the post is a clamping bolt 56 extending through the slot so that the inner section may be adjustably raised upon the outer section and secured in adjusted position. The inner section of the post is, like the outer section, also hollow and adapted to telescope in said inner section is an arm 57. At its upper end, a wall of the inner section of the post is cut away to form a notch adapted to receive the arm and secured to the arm is a pin 58 engageable through the upper section of the post and through said arm for supporting the arm to extend at substantially right angles to the post. Removably mounted upon the arm is a canopy 59. This canopy includes, as particularly shown in Figure 16 of the drawings, a bottom frame which is preferably constructed of suitable lengths of wire and comprises side members 60 and end members 61. The side members are provided at their ends with loops and the end members are looped at corresponding ends thereof to engage through the loops of one of the side members while at the opposite ends of said end members are formed hooks engageable through the loops of the other of the side members. The frame may thus be collapsed. A strip of canvas or other approved fabric is secured at its ends to the side members 60 and is threaded through a hanger 62 having an eye 63 adapted to slidably receive the arm 57 for supporting the canopy to hang therefrom. In conjunction with the canopy, I provide a pair of side curtains 64 and an end curtain 65. These curtains, are as shown in Figure 16, preferably secured together and are equipped with hooks 66 by which said curtains may be secured to the frame of the canopy. As will be observed, the end curtain 65 is extended above the upper ends of the side curtains for closing the canopy at one end.

In Figures 17 and 18 of the drawings, I have shown a slightly modified form of canopy post as well as a slightly modified form of canopy hanger. The modified post comprises a lower section 66 having at its lower end a stud 67 whereby the post may be removably connected with the arm 17 and threaded at one end into the upper end of said section is the upper section 68 of the post. Threaded into the upper end of this section is a laterally directed arm 69 corresponding to the arm 57 of the preferred form of post. The modified canopy hanger is, as particularly shown in Figure 18, formed from a length of suitable resilient wire bent to provide a loop 70 from which extends a twisted shank 71. At the upper end of this shank, the end portions of the wire are separated to form oppositely directed arms 72 provided at their ends with upstanding alined loops 73 adapted to freely receive the arm 69 therethrough. Slidable upon the arm between said loops is a sleeve 74 carrying a set screw 75. Thus, the sleeve may be adjusted along the arm for positioning the hanger when the set screw may be tightened for securing the hanger in adjusted position.

Normally supporting the arm 17 collapsed is, as particularly shown in Figures 3, 5, 6 and 7 of the drawings, a lock box 76. This lock box includes a box body riveted or otherwise secured beneath the running board 12 of the vehicle and provided in one side wall thereof with an opening 77 adapted to freely receive the terminal 19 of said arm. The box body is open at its lower side as well as at one end thereof and normally closing the body is a closure slide 78 slidably supported by suitable cleats upon the side walls of the body, these cleats being received in grooves in the side edges of the slide. Thus, after the terminal 19 of the arm has been moved to project through the opening 77 into the box body, the slide may be closed beneath said terminal for sustaining the arm at its outer end. Mounted upon the slide is a lock 79 of appropriate construction and extending from the adjacent side wall of the box body is a lug 80 behind which the bolt of the lock may be projected for securing the slide closed. Accordingly, the arm 17 may be locked in its collapsed position.

In Figure 8 of the drawings, I have shown a slightly modified form of lock box. In this modification, a box body 81 is employed. Formed in one side wall of the box body is an opening 82 corresponding to the opening 77 of the preferred form of lock box and adapted to freely receive the terminal 19 of the arm 17. Extending across one end of the box body at its lower side is a cross strip 83 upon which is mounted a keeper 84 and normally closing the box body is a plate 85 hinged upon the opposite end of the box body. This plate carries a lock 86 of approved type and, of course, the bolt of the lock is adapted to engage within the keeper 84 for securing the plate closed.

As previously intimated, the arm 17 is, as shown in Figure 3, normally secured in collapsed position beneath the vehicle so that the tool box will be out of the way while access to the box will be unhandy and difficult. To use the kit the slide 78 of the lock box 76 is released and withdrawn, thereby freeing the arm 17 at its outer end. By pulling upon the outermost section of the arm, the arm is then extended so as to bring the tool box 30 from beneath the vehicle when the supporting leg for the arm is released and swung downwardly, as shown in Figure 1, for sustaining the arm at its outer end. The tool box may then be opened when the tools therein will be conveniently accessible. In this connection it will, of course, be understood that the arm 17 may be extended at either one side or the other of the vehicle and may be swung to project either forwardly or rearwardly for supporting the tool box near any one of the wheels of the vehicle. If the presence of the lamp 52 is desired, the lamp bracket may, as also shown in Figure 1, be arranged in position upon the tool box. Should it be raining or if protection from the sun is desired, the canopy post 53 may, as further suggested in Figure 1, be mounted upon the arm 17 and the canopy 59 arranged in position upon the post for shielding the operator. I accordingly provide a particularly efficient tool kit for the purpose set forth and a device which, as will now be clear, may be readily employed in connection with substantially any conventional design of motor vehicle.

While the device is particularly designed for use as a tool kit still, as will be seen, the tool box of the device may be employed for carrying various articles other than tools. For instance, the tool box will provide a very safe place for carrying money or other valuables, the inaccessibility of the box particularly recommending the use of the device for this purpose.

Having thus described the invention, what is claimed as new is:

1. The combination with a motor vehicle, of tool holding means pivotally mounted beneath the vehicle body and shiftable to a position projecting at either one side or the other of the vehicle beyond the lines thereof.

2. The combination with a motor vehicle, of tool holding means, and lineally extensible means normally supporting the first means beneath the vehicle body and operable to project such means to a position exposed at one side of the vehicle.

3. The combination with a motor vehicle, of tool holding means, and an extensible arm normally supporting said means beneath the vehicle body and operable to dispose said means at either one side or the other of the vehicle projecting beyond the lines thereof.

4. The combination with a motor vehicle, of an extensible arm mounted at one end beneath the vehicle body for swinging movement, and tool holding means carried by the arm and normally supported thereby beneath the vehicle, the arm being extensible to dispose said means at either one side or the other of the vehicle projecting beyond the lines thereof.

5. The combination with a motor vehicle, of a post secured to the vehicle body to project therebeneath, an extensible arm mounted at one end upon said post, said arm being formed of slidably connected sections, means coacting with the opposite end of the arm normally securing the arm disposed beneath the vehicle, and tool holding means carried by the arm, the arm being extensible to dispose said means at one side of the vehicle.

6. The combination with a motor vehicle, of an extensible arm mounted at one end beneath the vehicle body, a lock box mounted upon a running board of the vehicle coacting with the opposite end portion of the arm for normally securing the arm disposed beneath the vehicle, and tool holding means carried by the arm, the arm being extensible to dispose said means at one side of the vehicle.

7. The combination with a motor vehicle, of an arm mounted at one end beneath the vehicle body and extensible to project at one side of the vehicle, tool holding means carried by the arm, and a leg pivoted upon the arm for supporting the arm at its free end when said arm is extended.

8. The combination with a motor vehicle, of an arm mounted at one end beneath the vehicle body and extensible to project at one side of the vehicle, tool holding means carried by the arm, a leg frame pivoted upon the arm having a laterally directed stop bracket movable to engage beneath the arm when said frame is disposed in vertical active position, and a foot slidable upon said frame and movable to active position at the lower end of the frame for engagement with the ground to support the free end portion of the arm when said arm is extended.

9. The combination with a motor vehicle, of an arm mounted at one end beneath the vehicle body and extensible to project at one side of the vehicle, said arm being formed of slidably connected sections, a tool box carried by the arm, and a lamp bracket removably supported by the box.

10. The combination with a motor vehicle, of an arm mounted at one end beneath the vehicle body and extensible to project at one side of the vehicle, a tool box carried by the arm, and a lamp bracket removably supported by the box and including a bracket arm, a base rotatably adjustable upon the arm, a lamp supporting plate rotatably adjustable upon the base in a plane at substantially right angles to the plane of adjustment of the base, and lamp holding means carried by said plate.

11. The combination with a motor vehicle, of an arm mounted at one end beneath the vehicle body and extensible to project at one side of the vehicle, tool holding means carried by the arm, a post removably engaged with the arm adjacent said means, and a canopy detachably sustained by the post.

12. The combination with a motor vehicle, of an arm mounted at one end beneath the vehicle body and extensible to project at one side of the vehicle, tool holding means carried by the arm, a post removably engaged with the arm adjacent said means, and a canopy detachably sustained by the post and including a hanger, a side wall strip threaded through said hanger, and a collapsible frame connected to the ends of the strip and normally supporting said ends spaced apart.

13. The combination with a motor vehicle, of an arm mounted at one end beneath the vehicle body and extensible to project at one side of the vehicle, and a lock box secured to a running board of the vehicle and normally securing said arm at its free end, said box including a box body provided in a wall thereof with a notch freely receiving the outer end portion of the arm, and a slide normally closing the box body extending beneath said end portion of the arm.

14. The combination with a motor vehicle, of an arm mounted at one end beneath the vehicle body and extensible to project at one side of the vehicle, tool holding means carried by said arm, a post removably engaged with the arm adjacent said means, said post being formed of adjustably connected telescopic sections, an arm projecting from the upper end of the post and adapted to telescope in the uppermost section of the post, and a canopy removably sustained by the arm.

15. The combination with a motor vehicle, of an arm swiveled therebeneath, and tool holding means carried by the arm and normally supported thereby beneath the vehicle, the arm being operable to dispose said means at either one side or the other of the vehicle projecting beyond the lines thereof.

In testimony whereof I affix my signature.

RAYMOND F. NELSON. [L. S.]